May 14, 1963  R. R. GOINS  3,089,194
PROCESS AND APPARATUS FOR TREATING PLASTIC MATERIAL
Filed Oct. 10, 1955  3 Sheets-Sheet 2

INVENTOR.
R.R. GOINS

BY
*Hudson & Young*
ATTORNEYS

3,089,194
Patented May 14, 1963

3,089,194
PROCESS AND APPARATUS FOR TREATING PLASTIC MATERIAL

Robert R. Goins, Bartlesville, Okla., assignor to Phillips Petroleum Company, a corporation of Delaware
Filed Oct. 10, 1955, Ser. No. 539,523
4 Claims. (Cl. 18—47.5)

This invention relates to process and apparatus for treating plastic material. In one aspect, it relates to evaporation of solvent from a viscous solution of plastic material. In another aspect, it relates to a method for recovering a plastic material from a solution thereof. In another aspect, it relates to an improved apparatus for effecting evaporation of such solution and disintegration of the resulting solid.

In the production of certain polymers, the material produced is processed in the form of solutions. Thus, in the production of polyethylenes, solutions of polyethylene in a hydrocarbon solvent are processed. Recovery of the polyethylene from the solution is ultimately necessary. This can be done by evaporation of the solvent. The solution can be sprayed through a nozzle into an evaporation chamber where the solvent is evaporated by heating and/or pressure reduction, e.g., flashing in a vacuum. An advantage of vacuum flashing is that the polymer can be recovered at a temperature below its melting point. In such a process it is often desirable to recover the polymer as a particulate, flowable, solid residue. However, it has been found that certain polymers, e.g., polyethylenes having molecular weights from about 5000 to about 200,000 impart extraordinarily high viscosities to solutions thereof in hydrocarbons such as 2,2,4-trimethylpentane and cyclohexane, even when the concentration of such a solution is 10 weight percent polymer or less. Often, when such a solution is forced through a nozzle into an evaporator, the residue (polymer) is obtained in the form of long strands or filaments rather than in the preferred form, i.e., particles or granules.

An object of this invention is to obtain an evaporation residue, of the type described in granular or particulate form suitable for transfer, in the solid state, by so-called "fluidized solid" techniques, including gravity flow.

Another object is to provide an improved evaporation apparatus for the handling of viscous solutions of polymers or other plastic materials. Other objects and advantages will be apparent to those skilled in the art from the following description.

According to this invention, a viscous solution of a normally solid material which forms strands or filaments rather than drops when forced through a constricted opening into an evaporation zone is mechanically comminuted upon leaving said opening. The invention is also applicable to dispersions of plastic material in a diluent which are considered to be included within the scope of the terms "solvent" and "solutions," as used herein.

Further according to this invention, there is provided, in an apparatus comprising an evaporation chamber, an inlet for fluid in said chamber, and means for withdrawing vapor from said chamber, the improvement which comprises chopping means having at least one cutting blade and means for moving said blade, in its own plane, adjacent said inlet and transversely with respect to the axis thereof. The design of said chopping means is such that its action is primarily a cutting or chopping action rather than a beating action. Preferably, the chopper is a rotatable chopper driven by a suitable motor.

In the drawings, FIGURE 1 is a diagrammatic flow sheet illustrating the practice of this invention in connection with a polymerization process of the type more fully described in copending applications Serial Nos. 476,306, filed December 20, 1954, now abandoned, filed as continuation-in-part application Serial No. 573,877, March 26, 1956, now U.S. 2,825,721, by J. P. Hogan and R. L. Banks and Serial No. 496,515 filed March 24, 1955, by M. R. Cines;

Figure 1:
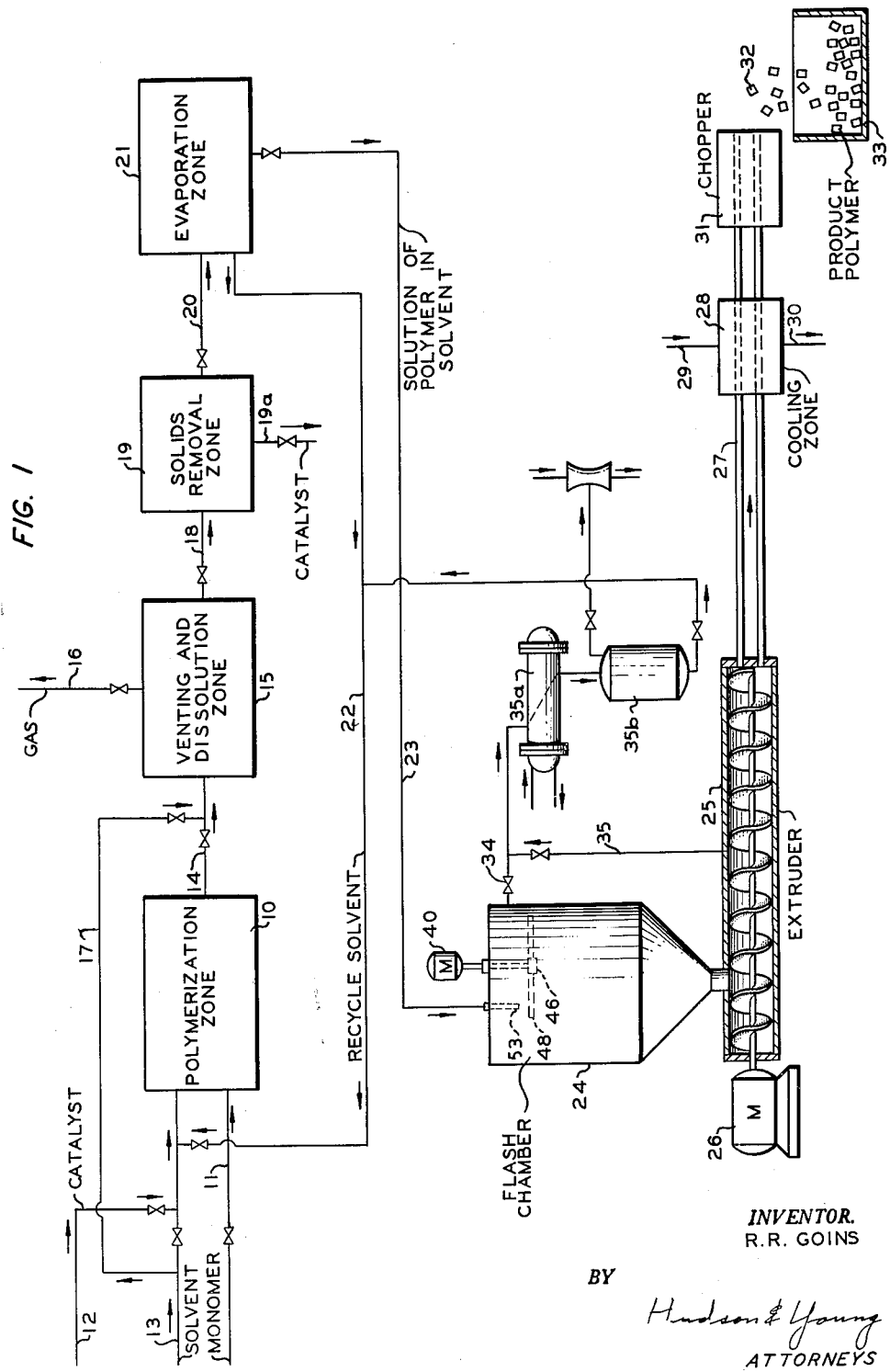
Figure 2:
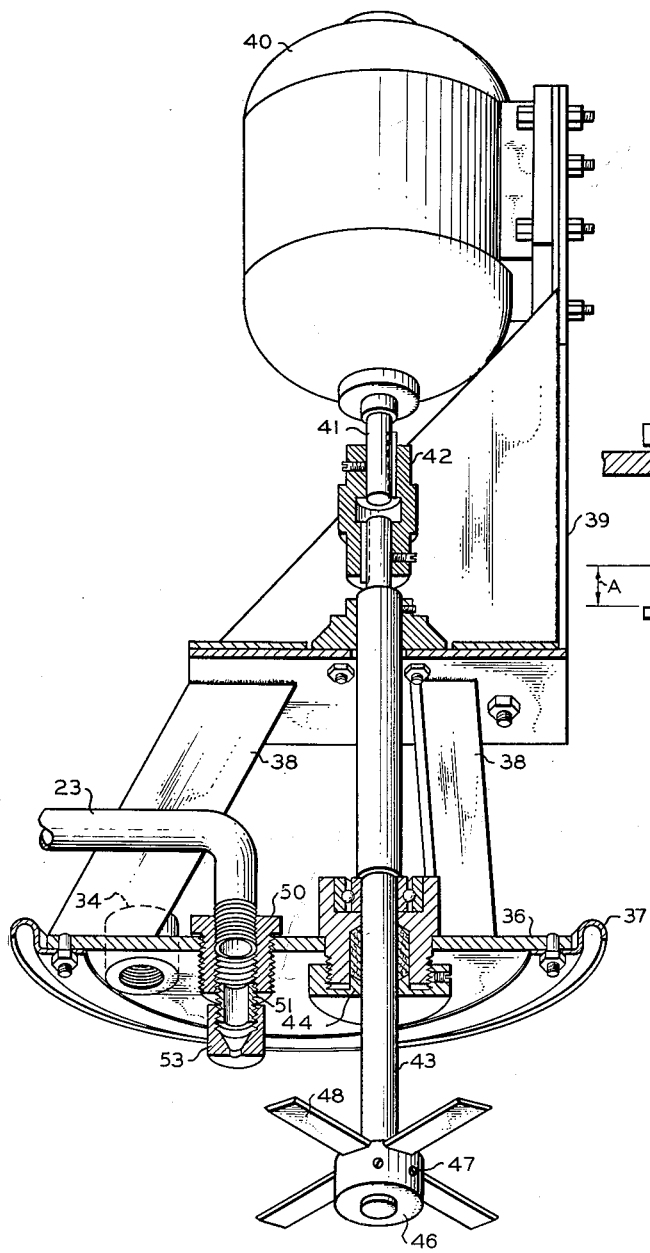
FIGURE 2 is a perspective view showing the chopping mechanism of the invention.
Figure 3:
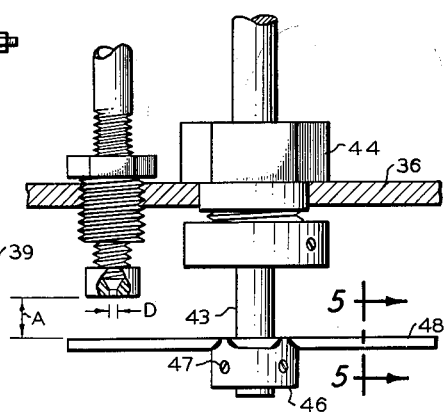
FIGURE 3 is an enlarged vertical view, partially in section, of the assembly of FIGURE 2.
Figure 4:
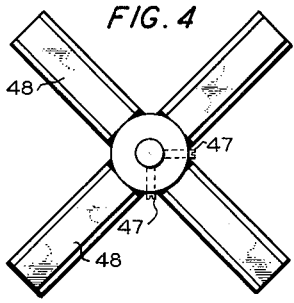
FIGURE 4 is a bottom view of the cutter blade assembly.
Figure 5:
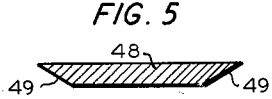
FIGURE 5 is a sectional view taken along the line 5—5 of FIGURE 3, looking in the direction of the arrows.

Referring now to FIGURE 1, the material to be polymerized, such as ethylene, is fed to a polymerization zone 10 through a valved line 11. A polymerization catalyst is fed to the zone 10 through a valved line 12, and this catalyst can be admixed with a solvent fed to the polymerization zone 10 through a valved line 13. The effluent from the polymerization zone 10 passes through a valved line 14 to a venting and dissolution zone 15 from which unreacted monomers, such as ethylene, are removed by a valved line 16. In some cases, additional solvent is introduced into the line 14 by a valved line 17.

The polymer, freed of unreacted monomers, then passes through a valved line 18 to a solids removal zone 19 wherein the polymerization catalyst is removed. The catalyst-free polymer, in the form of a viscous solution, passes through a valved line 20 to an evaporation zone 21 where up to 50 percent of the solvent, enough to permit subsequent processing, is removed and recycled through a line 22.

The solution of polymer leaving the evaporation zone 21 passes through a line 23 to a flash chamber 24. The invention is applicable to solutions or dispersions of plastic materials in general. These materials ordinarily have a molecular weight ranging from 1,000 to 300,000, more specifically 30,000 to 60,000. In one specific embodiment of the invention, a 10 percent solution of polyethylene in cyclohexane is fed at a pressure of 80 pounds per square inch gage and a temperature of 400° F. to the flash chamber. In this particular process, the temperature of the feed can vary from about 200 to 500° F., the polyethylene concentration can vary from 5 to 25 percent by weight based on the solution, and the pressure can vary from 25 to 150 pounds per square inch gage. Various diluent or solvent materials are applicable, for example, aliphatic and alicyclic hydrocarbons of 3 to 12, preferably 5 to 12 carbon atoms per molecule, specifically propane, normal butane, cyclohexane, methylcyclohexane, isooctane and dodecane.

In the flash chamber 24, a substantial amount of solvent is removed and the polymeric material is recovered in the form of discrete wet solid particles containing about 0 to 20, preferably 0 to 5 percent solvent. This result is accomplished by the novel introduction and cutting blade means hereinafter described in detail.

The solid discrete polymer particles are then introduced into an extruder 25 driven by a motor 26, whence they pass through a conduit 27 embodying a cooling zone 28 through which cooling fluid is admitted by a conduit 29 and withdrawn by a conduit 30. The cooled material passes to a chopper 31 from which the polymeric material is recovered as small blocks 32 of dry material which are collected in a vessel 33.

The solvent separated from the polymer in chamber 24 is fed through a line 34 which joins a valved line 35 conveying solvent from the extruder 25. The combined streams pass through a heat exchanger 35a and a vacuum drum 35b to the solvent recycle line 22.

Referring now to FIGURES 2, 3, 4 and 5, it will be noted that the flash chamber has a heavy metal cover 36 which is bolted to a heavy metal ring 37 at the edge of the chamber. Secured to the cover 36 by legs 38 is a metal frame or support 39 on which is mounted a motor 40. The motor 40 has a shaft 41 which is connected by a fitting 42 to a cutter drive shaft 43 journalled in a bearing 44 in the cover plate 36.

A hub 46 is secured to the drive shaft 43 by a pair of set screws 47, and a plurality, for example 4, of cutter blades 48 are welded or otherwise suitably secured to the hub and ground so as to form a balanced rotatable assembly. As will be evident from FIGURE 5, the edges of each blade 48 are ground so as to produce a tapered cutting edge 49 along each side of the blade.

Threaded within the cover plate 36 is a retainer nut 50 having an internally threaded passage which receives the polymer inlet conduit 23. Also received within this threaded passage is a nipple 51 to which is secured a spray nozzle 53. Solvent evaporates from the solution after it leaves the spray nozzle causing at least a portion of the polymer to solidify before it reaches the path of cutter blade 48.

In one specific installation, the diameter D of the orifice was $\frac{1}{16}''$ and the orifice was positioned a distance A of $1''$ from the top surface of the cutter blades. The latter distance is important because it must be sufficient to allow at least a portion of the polymeric material to solidify before it moves into the path of the chopper blades. Thus, if the polymer is still substantially liquid, satisfactory disintegration is not effected. The distance, of course, varies with different types of polymeric material, with changes in feed pressure, flash chamber pressure, temperature, and composition of the feed material. In general, where the flash chamber pressure is atmospheric, as in the specific example described, the distance A varies between $\frac{1}{2}$ and $2''$.

In operation of the present system, feeding of the material onto the chopper blades in the manner described effectively prevents the formation of "strings" or "ropes" which caused considerable difficulty in removal of the polymer from the flash chamber and in subsequent processing where the nozzle and cutting mechanism of the invention were not employed.

Although the invention has been illustrated in connection with a vacuum flash chamber, it is equally applicable to pressure and atmospheric operations, vacuum operation usually being desirable. The preferable minimum operating pressure is such that the solvent vapor can be condensed with ordinary cooling water although refrigerated condensers are within the scope of the invention. Using cyclohexane as the solvent, the vapors can be condensed at about 5 pounds per square inch absolute with 100° F. cooling water. The temperature in flash chamber 24 is preferably below the melting point of the polymer, i.e., below about 240° F. in the case of most polyethylenes produced by the process set forth in the cited application of Hogan and Banks. The chopper can be rotated at any speed desired which is sufficient to disintegrate the solidified plastic material but high speeds are usually the most desirable. A speed of 3600 revolutions per minute is satisfactory, and is about the highest speed that is ordinarily obtainable by direct drive with electric motors. However, special motors having higher speeds, say 5000 revolutions per minute are suitable.

Figure 6:
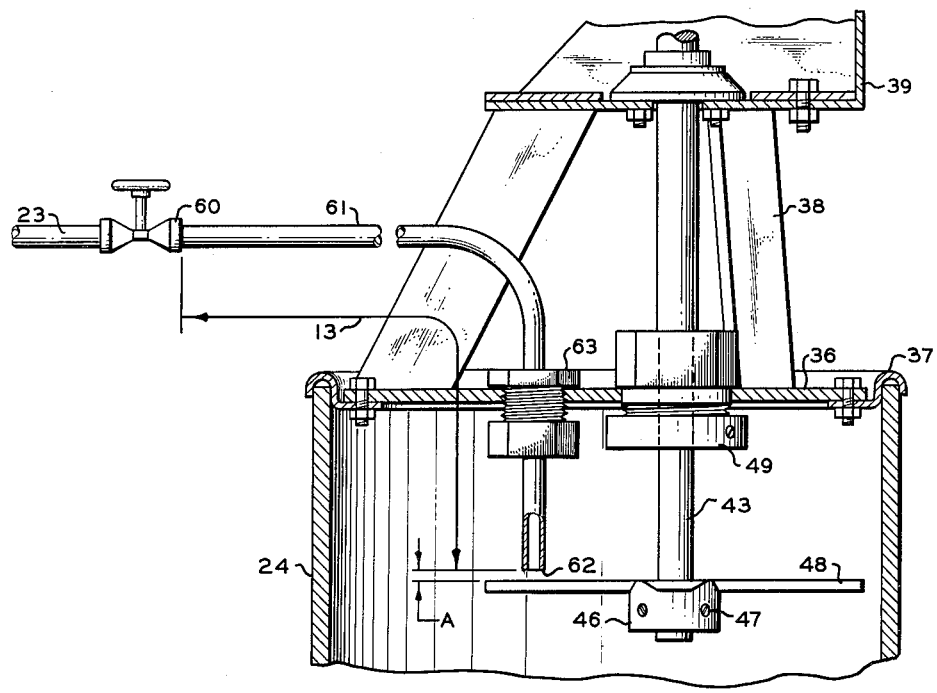
FIGURE 6 is a front elevational view, partially in section, of a modified form of chopping and feeding mechanism.

According to a second specific embodiment of the invention, improved results can be obtained where the discharge orifice is positioned closer to the chopper blades, and pressure reduction takes place in the feed conduit a substantial distance upstream of the discharge orifice. This embodiment is illustrated in FIGURE 6, where parts similar to those already described are identified by like reference numerals. In this case, the inlet conduit 23 is connected to a pressure reduction valve 60, such as a needle valve. A section 61 of the tube or pipe connects the downstream end of this valve to a discharge region 62 within the flash chamber 24, the pipe entering the chamber through a bushing 63. In this instance, the polymeric material is solidified within pipe section 61 so that, as a result, the distance A can be considerably reduced, for example, to $\frac{1}{4}''$ or a range of $\frac{1}{16}$ to $\frac{1}{2}''$. With this reduced spacing between the discharge region and the upper part of the cutter blades, the distance 13 between the needle valve and the discharge region must be sufficient to allow the polymeric material to at least partially solidify before it is discharged from the opening 62. In the specific example described herein, the distance 13 is $24''$, although this distance can vary between $3''$ and $60''$ depending upon the temperature, pressure, feed composition, pipe size and other variables. Improved operation is obtained with the system of FIGURE 6 because the polymer is cooled as it passes through the tube 61, and enters the flash chamber considerably below its melting point.

Figure 7:
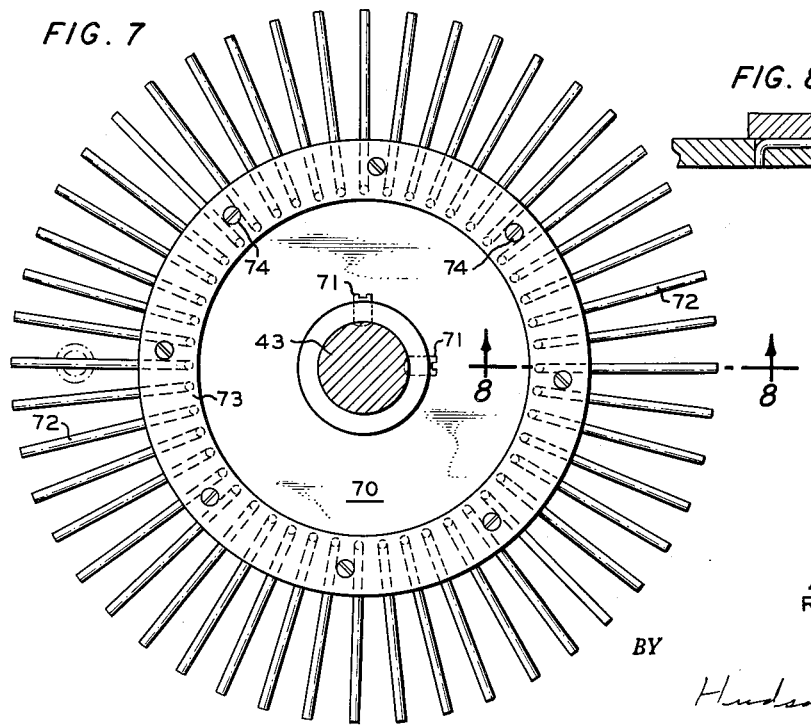
FIGURE 7 is a bottom view of a modified cutter blade assembly.
Figure 8:
FIGURE 8 is a sectional view taken along the lines 8—8 of FIGURE 7, looking in the direction of the arrows.

In FIGURES 7 and 8, I have shown an alternate form of chopping device. In this embodiment, an enlarged hub 70 is attached to the drive shaft 43 by set screws 71. Formed in the outer edge of the hub are a plurality of openings in each of which is disposed a piece 72 of stiff wire which is clamped between the hub and a top plate 73, FIGURE 8, secured to the hub by bolts 74. Where this chopping device is substituted for that of FIGURES 1–6 inclusive, the results of the invention are attained in that the solid plastic material entering the flash chamber is effectively disintegrated so that no ropes, strings or the like are present in the chamber which would cause problems in removal and subsequent processing of the material.

Although, as indicated, the process and apparatus are applicable generally to treatment of viscous solutions of plastic material, they have special importance and application to homopolymers and copolymers of 1-olefins containing no more than 8 carbon atoms and having no branching nearer the double bond than the 4 position. As an example of a specific process for producing a polymer of this type, can be mentioned the polymerization of ethylene with a chromium oxide catalyst supported on silica, alumina, or silica-alumina. In this system, the feed is ethylene of 95% purity containing small quantities of impurities such as methane, ethane or carbon dioxide. This material is fed at a rate of 14.6 cubic feet per hour to the reactor together with one gallon per hour of isooctane solvent introduced through line 13 together with sufficient catalyst to maintain 0.1 to 0.5, specifically 0.3 weight percent catalyst in the effluent. The reactor is operated at a temperature of 285° F. and a pressure of 500 pounds per square inch gage, i.e. sufficient to maintain a liquid phase in the reactor. The reactor effluent contains 0.3 weight percent catalyst, 6.5 weight percent polyethylene, 6.5% ethylene, 0.7% light gaseous impurities and 86.0% solvent.

It will be understood, of course, that the invention is not to be limited to the specific example given, even in its very advantageous application to the treatment of homopolymers of 1-olefins having no more than 8 carbon atoms with no branching nearer the double bond than the four position. For example, the olefin polymers such as propylene, 1-octene, and the like can be advantageously recovered by the system of this invention, and in some cases the polymer of diolefins or conjugated diolefins of no more than 8 carbon atoms can be advantageously recovered.

Further, various polymerization catalysts can be used, and various materials, such as thoria and zirconia are suitable as supports and have catalytic activity. Additional promoters such as zinc oxide, magnesium oxide, strontium oxide, and the like can be employed. Also, various solvents can be utilized provided that they do not impair the activity of the catalyst. Thus aliphatic and alicyclic hydrocarbons of 3 to 12 carbon atoms preferably 5 to 12 carbon atoms per molecule are suitable, specifically propane, normal butane, cyclohexane, methylcyclohexane and isooctane.

Finally, the reaction temperatures, pressures and feed rates can be varied, a range of 150 to 450° F. being used for the recited 1-olefins generally with a preferred range for propylene of 150 to 250° F. and for ethylene of 275 to 375° F., with a pressure varying from atmospheric to 700 pounds per square inch gage or higher.

In dissolution zone 15, the mixture is maintained in a state of turbulence, as, for example, by means of a mechanical motor-driven stirrer and the temperature is maintained, for example, by the use of heater at from 300 to 325° F., i.e., somewhat higher than that utilized in the reaction zone 10. The pressure is sufficient to maintain the solvent substantially in the liquid phase, but is preferably lower than that in reaction zone to facilitate the evolution of dissolved gas, including unreacted ethylene, which is vented through the outlet 16. The effluent from the dissolution zone 15 passes through conduit 18 to the solids removal zone 19. The material passed through the conduit 18 is a homogeneous solution of substantially all of the polymer in the solvent, which solution contains suspended solid catalyst.

The solids removal zone contains any suitable equipment or combination thereof known in the art for the removal of suspended solids from liquids. For example, it can be a filter or a centrifuge. It should be suitable for operation under pressure in order to maintain the solvent in the liquid phase during the filtration. Catalyst removed by the filtration is withdrawn from the system through a conduit 19a. The withdrawn catalyst can be regenerated or reactivated, if desired, and recycled to a catalyst storage zone in any suitable manner.

The solution which has been freed of suspended solids is passed through the conduit 20 to the evaporation zone 21 which is ordinarily in the form of a flash evaporation tank and is operated, for example, at a temperature of 290° F. and a pressure of 33 p.s.i.g. The evaporated solvent, after condensation, is returned to conduit 22. The residue from evaporation zone 21 which can be heated in said zone 21 to a temperature of 310° F., for example, is introduced into the flash chamber 24 for treatment in the manner already described in detail.

While the invention has been described in connection with a present, preferred embodiment thereof, it is to be understood that this description is illustrative only and is not intended to limit the invention.

I claim:

1. The method of treating a solution of plastic material which comprises passing said solution along a confined path at a pressure sufficient to maintain said dispersion in the liquid phase, abruptly releasing said pressure and subsequently passing said dispersion along said confined path for a distance sufficient to effect solidification of the plastic material, discharging the solidified material from said confined path, contacting the discharged material closely adjacent the discharge region with a cutting edge having sufficient velocity to effect disintegration of the solidified material, maintaining a reduced pressure in the region of said discharge zone to flash off said solvent, and recovering the resulting disintegrated solid plastic material.

2. The method of claim 1 wherein said plastic material is polyethylene and the solvent is selected from the class consisting of aliphatic and alicyclic hydrocarbons of 3 to 12 carbon atoms per molecule.

3. The method of treating a solution of polyethylene in a solvent selected from the class consisting of aliphatic and alicyclic hydrocarbons of 3 to 12 carbon atoms per molecule which comprises feeding said solution of polyethylene having a concentration of 5 to 25 percent by weight based on the solution through a confined path at a pressure of 25 to 150 pounds per square inch gage and sufficient to maintain said solution in the liquid phase, abruptly reducing said pressure and thereafter passing said solution along said confined path for a distance of 3 to 60″ and sufficient to effect solidification of the polyethylene, downwardly discharging the resulting solid material from said confined path into a zone of reduced pressure wherein a substantial portion of the solvent is flashed off, repeatedly passing a series of cutting edges in a generally horizontal plane beneath the discharge region at a distance of $\frac{1}{16}$ to $\frac{1}{2}$″ therefrom, said cutting edges having sufficient velocity to disintegrate the stream of solid polyethylene and form small discrete particles thereof, and recovering the disintegrated particles.

4. The method of claim 3 wherein the cutting edges engage the solid polyethylene about $\frac{1}{4}$″ below the discharge region, the distance between the region of pressure reduction and the discharge region is about 24″ and the pressure in the zone adjacent said discharge region is substantially atmospheric pressure.

References Cited in the file of this patent

UNITED STATES PATENTS

| | | |
|---|---|---|
| 2,021,837 | Davidson | Nov. 19, 1935 |
| 2,168,288 | Fischer | Aug. 1, 1939 |
| 2,405,977 | Peters | Aug. 20, 1946 |
| 2,431,042 | Ingersoll | Nov. 18, 1947 |
| 2,448,849 | Wagner et al. | Sept. 7, 1948 |
| 2,464,746 | Gering | Mar. 15, 1949 |
| 2,496,653 | Allen et al. | Feb. 7, 1950 |
| 2,516,295 | Borton et al. | July 25, 1950 |
| 2,531,739 | Orsini | Nov. 28, 1950 |
| 2,576,977 | Stober | Dec. 4, 1951 |
| 2,583,319 | Brake | Jan. 22, 1952 |
| 2,774,105 | Bernhardt | Dec. 18, 1956 |